United States Patent [19]

Ong et al.

[11] 4,209,333
[45] Jun. 24, 1980

[54] POLYGLYCOL ESTERS, PROCESS FOR THEIR PREPARATION AND THEIR USE AS SURFACE-ACTIVE AGENTS

[75] Inventors: Sienling Ong; Ulrich Cuntze, both of Hofheim am Taunus, Fed. Rep. of Germany

[73] Assignee: Hoechst Aktiengesellschaft, Frankfurt, Fed. Rep. of Germany

[21] Appl. No.: 917,497

[22] Filed: Jun. 21, 1978

[30] Foreign Application Priority Data

Jun. 25, 1977 [DE] Fed. Rep. of Germany ....... 2728767
Dec. 31, 1977 [DE] Fed. Rep. of Germany ....... 2759204

[51] Int. Cl.² ............... B01F 17/00; C09D 11/00; C09D 11/14; C11C 3/04
[52] U.S. Cl. ............................ 106/25; 106/19; 106/20; 252/309; 252/312; 252/356; 252/358; 260/29.6 R; 260/29.6 XA; 260/410.6
[58] Field of Search ....... 260/410.6, 29.6 R, 29.6 XA; 252/309, 312, 356, 358; 106/19, 25, 31, 20

[56] References Cited

U.S. PATENT DOCUMENTS

| 2,457,139 | 12/1948 | Fife et al. | 260/410.6 |
| 2,677,700 | 5/1954 | Jackson et al. | 260/410.6 |
| 2,911,434 | 11/1959 | Kocher | 260/410.6 |
| 2,950,299 | 8/1960 | Kirkpatrick | 260/410.6 |
| 2,950,313 | 8/1960 | Kirkpatrick | 260/410.6 |
| 2,969,388 | 1/1961 | Niedehauser | 260/410.6 |
| 2,987,490 | 6/1961 | Kirkpatrick et al. | 260/410.6 |
| 3,634,472 | 1/1972 | Miles | 260/410.6 |
| 3,637,523 | 1/1972 | Harwood | 260/410.6 |

FOREIGN PATENT DOCUMENTS 1595369 4/1970 Fed. Rep. of Germany .
1368671 10/1974 United Kingdom .

Primary Examiner—Allan Lieberman
Attorney, Agent, or Firm—Connolly and Hutz

[57] ABSTRACT

Polyglycol esters which can be obtained by partially esterifying an oxalkylate of 1,1,1-trimethylolethane or pentaerythritol with a mixture of ethylene oxide and propylene oxide in the molar ratio of from 2:1 to 4:1 with sub-stoichiometrical amounts of a carboxylic acid having from 10 to 20 carbon atoms or an acylating derivative of such a carboxylic acid may be used as surface-active agents. The polyglycol esters increase and/or stabilize the viscosity of aqueous systems and are also suitable as emulsifying agents.

14 Claims, 1 Drawing Figure

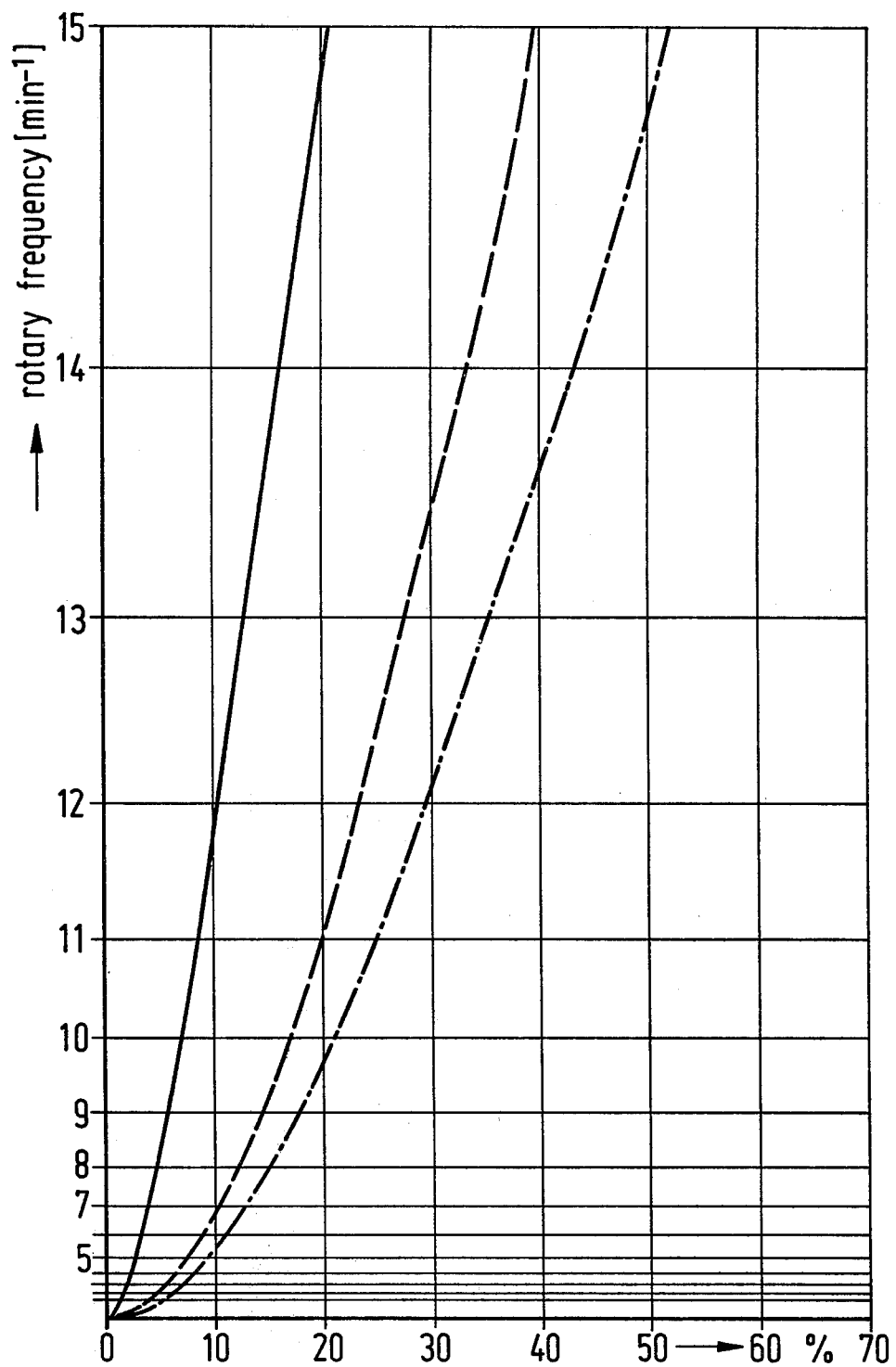

POLYGLYCOL ESTERS, PROCESS FOR THEIR PREPARATION AND THEIR USE AS SURFACE-ACTIVE AGENTS

The present invention relates to polyglycol esters, a process for preparing them and their use as surface-active agents.

The present invention provides polyglycol esters of the formula I

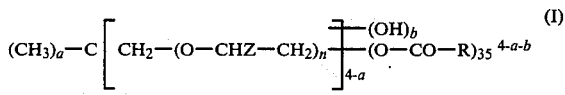

in which R is an open-chain aliphatic radical having from 9 to 19, preferably from 11 to 17 carbon atoms, Z stands for hydrogen and methyl, the ratio of H:CH$_3$ being from 2:1 to 4:1, preferably from 2.5:1 to 3.5:1, a is zero or 1, b is 1 to 1.5 and (4-a)·n is 150 to 300, preferably 200 to 250.

Particularly preferred polyglycol esters are those in which the radical R-CO is oleyl, the ratio of H:CH$_3$ in the radical Z is 3:1 in random distribution, a stands for zero, b is 1.1 and (4-a)·n is about 210.

Another subject of the invention is a process for the preparation of the above-mentioned polyglycol esters, which comprises oxalkylating a compound of the formula

in which a is zero or 1, with 150 to 300 times, preferably 200 to 250 times, especially about 210 times the molar amount of a mixture of ethylene oxide and propylene oxide in a molar ratio of from 2:1 to 4:1 and partially esterifying the oxalkylate with (4-a-b mols of) an acylating agent introducing the radical R—CO—. As acylating agents of this kind there are mentioned natural or synthetic fatty acids, such as stearic acid, palmitic acid, oleic acid, linolenic acid, tallow fatty acid, tall oil fatty acid, isostearic acid, coconut oil acid or mixtures of these acids, as well as the corresponding acid chlorides.

Yet another subject of the invention is the use of the novel polyglycol esters as surface-active, or, respectively, a process for modifying the surface or interface tension of liquids, especially aqueous compositions.

The novel polyglycol esters are suitable, above all, for the increase and/or stabilization of the viscosity of aqueous systems, especially as additives to printing pastes or padding liquors. For this purpose the polyglycol esters are added in an amount of from about 0.1 to about 10%, calculated on the weight of the ready preparation, i.e. from about 1 to 100 g, preferably from 2 to 30 g, of polyglycol ester per kg of printing paste or per liter of padding liquor.

Aqueous preparations of the polyglycol esters of the invention may already be used as thickening agents without further additives. However, the novel polyglycol esters are particularly advantageous as additives to other known thickening agents, for in this manner they not only increase the viscosity of aqueous systems, but can also particularly stabilize the same.

It has been known that especially printing pastes on the basis of synthetic thickening agents or oil-in-water emulsions as well as mixtures of these emulsions with native thickeners lose their viscosity completely or partly, thus becoming useless, if electrolytes are added. Since the commercial dyestuffs and printing auxiliaries normally contain electrolytes, it cannot be avoided in practice to introduce electrolytes into the printing pastes. It is therefore generally required to carry out a series of preliminary tests in which the compatibility of the printing paste components is to be determined prior to arriving at a suitable printing paste which is fast to storage. In spite of these precautionary measures, however, it is often unavoidable that the printing pastes lose their viscosity after some time, especially under heat, i.e. in warmer countries or during summer.

As has already been known, a thickening agent has to meet a series of requirements: It has to prevent the flowing (bleeding) of dyestuff solutions caused by the capillary action of the tissu. Furthermore, in the roller printing process, it counteracts the tendency of the printing inks to run from the engravings of the rotating printing rollers following the law of gravity. The thickening agent also makes it possible to combine different reactants in a printing ink which in the absence of said thickener would react with each other prematurely, i.e. already in the printing ink and not on the fiber. In this case the thickening agent acts as "distancing agent" and prevents the early interaction of readily reactive components. Thus, it is possible, for example, to incorporate tannin into the printing ink of a cationic dyestuff without the risk of a formation of tannic acid color lake, which is to take place only during the steaming on the fiber. If a printing paste includes pigments, such as kaolin or zinc oxide, the thickening agent also serves to maintain these substances in a homogeneous dispersion, to prevent the pigment from sticking to the engravings of the rollers and to ensure its being applied in a homogeneous mixture with the printing ink.

Accordingly, the selection of a thickening agent depends on a great number of factors. It is determined, among other things, by the kind of printing process, the composition of the printing ink, the depth of the roller engraving and the desired color depth of the print, the quality of material, especially if a penetration of the print is required, and also by the kind of design, i.e. whether small or large prints (fitting design or blotch prints) are to be printed. The polyglycol esters of the invention are especially suitable as additives to synthetic thickening agents, particularly those which contain carboxy groups. As substances of this kind there are mentioned, above all, copolymers from maleic anhydride and a vinylalkyl ether or other copolymerizable monomers which may be cross-linked with polybasic amines, polyvalent alcohols or aminoalcohols, furthermore, polymers of acrylic acid, maleic acid or their anhydrides which also may be crosslinked with divinylbenzene or unsaturated diesters, such as dialkyl-maleic esters or ethylene-glycol-dimethacrylic esters.

Furthermore, the polyglycol esters of the invention are suitable as additives to oil-in-water and water-in-oil emulsions and their mixtures with native thickening agents. In all of these systems the polyglycol esters of the invention are not only capable to increase and/or stabilize the viscosity, but also allow the restoration of the viscosity of a system which has been damaged, for example, by the influence of electrolytes.

It has further been found that the compounds of formula I may also be used as emulsifying agents. The compounds of formula I are preferably used for the preparation of dyestuff emulsions which are used for the dyeing and printing of textile materials. These emulsions show an extremely good penetration capacity into the textile materials, so that regular deep dyeings are obtained which show good fastness properties.

In the coloration of textiles the stage which is most labor-consuming is the washing process in which thickening agents, dyestuff and auxiliary residues are eliminated from the textile goods. This is why attempts to rationalize the operation naturally start with the washing process. Emulsion thickeners are therefore used in textile printing pastes, since it is not necessary in this case to additionally eliminate the thickener residues. Even in cases where only semi-emulsions are used instead of full emulsions, the effect of rationalization is still considerable. Common emulsion thickeners for textile printing are prepared from water, an organic solvent or solvent mixture which is immiscible with water and an emulsifying agent. However, the emulsion thickeners which have been common so far show a series of drawbacks: Due to the relatively low emulsifying action of the common emulsifying agents, rather great amounts of these surface-active agents have been required, which often resulted in strong foaming when preparing the emulsions. Common defoaming agents, as they are used in the textile industry, may modify the stability and effectiveness of the printing pastes, however. In particular, there is the risk that the addition of defoaming agents may result in a decomposition of the emulsion, i.e. the ready emulsions are broken again. This effect frequently depends only on the quantitative ratio, i.e. surface-active agents may act as emulsifying agents up to a determined amount, and as emulsion decomposing agents if said amount is exceeded. The defoaming agents added therefore show a negative synergistic effect. A further drawback involved is the reduced fastness to rubbing of pigment prints.

Due to the high emulsifying effect of the compounds of formula I it is possible to use considerably smaller amounts for the preparation of a stable emulsion. Besides, the compounds of the formula I do not produce much foam anyway. Thus, it is not necessary to add defoaming agents to the emulsions of the invention. In the preparation of emulsion thickeners according to the present invention it is not required, therefore, to take special measures, as is the case with the common foaming emulsifying agents, for example to use inadequately large vessels. Owing to the small amounts of surface-active agents, the fastness to rubbing of the pigment prints prepared with the same is also increased, since the plastic film contains fewer foreign ingredients in the form of the difficulty volatile emulsifying agent. Besides, there results a softer feel of the goods printed according to the pigment printing process, as the amount of binding agents which is required to compensate the emulsifying agents adversely affecting the fastness to rubbing, however, which results in a stiff feel, may be considerably reduced.

Also in the so-called semi-emulsion thickeners, in which the printing pastes contain also water-swellable thickeners besides water and the above-mentioned solvents, the emulsifying agents of the invention show essential advantages in comparison with the commercial products: The common water-swellable thickeners, i.e. alginates, locust bean flour ethers, starch ethers or carboxymethylcellulose, contain more or less considerable amounts of alkali ions which are apt as electrolytes to break emulsions. Since semi-emulsion thickeners are used in most cases for printing pastes with reactive, disperse and acid dyestuffs, which dyestuffs are either electrolytes themselves or contain electrolytes in their commercial preparations, it has been attempted so far to solve this problem by using accordingly large amounts of emulsifying agents. These large amounts of emulsifying agents not only involved the drawbacks already mentioned above, but also frequently resulted in a reduction of the brilliancy of the prints. In contradistinction thereto, the emulsifying agents of the invention are markedly less sensitive to electrolytes than the products which have been used so far. This means that also in the case of semi-emulsions there may be used small amounts of emulsifying agents.

An emulsion thickening composition obtained in accordance with the present invention contains—calculated on the weight of the ready composition—from 0.1 to 2, preferably from 0.2 to 1%, of compounds of the formula I, from 50 to 70% of solvents immiscible with water and from 28 to 49.9% of water. As solvents immiscible with water there may be mentioned above all hydrocarbons, such as hexanes, heptanes, nonanes, cyclohexylbenzene, toluene, xylene, tetrahydronaphthalene and benzines (gasolines) or mixtures of these solvents.

The printing pastes prepared with these emulsion thickeners further contain colorants, especially pigments, and binders. If required, these printing pastes may also contain acid yielding agents, such as diammonium-hydrogenphosphate.

The printing pastes prepared with the emulsions of the invention yield very even and brilliant prints having sharp outlines. These printing pastes are suitable in particular for the pigment printing on cotton, spun rayon and other natural and synthetic fibers and mixtures thereof, especially on mixtures of natural and synthetic fibers. The emulsion thickeners of the invention are also suitable in admixture with water-swellable thickening agents, such as alginates, locust bean flour ethers, starch ethers or carboxymethyl cellulose compositions, for printing pastes with dyestuffs, for example disperse dyestuffs, reactive dyes and acid dyestuffs.

The preparation of the emulsions of the invention may be effected by jointly stirring the oily and aqueous phases with the emulsifying agent, or according to other common processes known from literature (P. Becker, Emulsions: Theory and Practice, Reinhold Publishing Corp., New York, 1957, p. 209, Houben-Weyl, vol. I/2, p. 97). In this case it is an advantage that the compounds of the formula I are water-soluble, so that they may be used as aqueous solutions for the preparation of the emulsions.

It is a special advantage of the compounds of formula I that usually only simple stirring units are to be used in the preparation of the emulsions. This is another factor by which the emulsifying process is made considerably simpler than in the case of other emulsifying agents.

The emulsions of the invention show an excellent stability. However, if in the case of a prolonged storage under unfavorable conditions a creaming up should nevertheless occur, this process is reversible, and the original emulsion can generally be restored even by gentle stirring.

By means of the emulsifying agents of the invention it is possible to prepare various emulsions. As oily phase there are preferably used, besides the above-mentioned organic water-immiscible solvents, age resisting agents, plasticizers and other auxiliaries for the caoutchouc industry, biologically active ingredients in the field of plant protection, auxiliary agents in the field of dyeing and textiles and leather processing and in the polymerization technique, especially for emulsion polymerization processes.

The following Examples serve to illustrate the invention, the parts and percentages being by weight, unless otherwise stated. Colour Index Numbers refer to the 3rd Edition.

EXAMPLE 1

A printing paste is prepared which has the following composition:
25 parts by weight of the pigment C.I. 74160 in a commercial liquid formulation
50 parts by weight of a binder on the basis of a self-reactive copolymer acrylate dispersion
50 parts by weight of a binder of a self-crosslinking copolymer dispersion on the basis of butadiene
15 parts by weight of hexakis-(methoxy-methyl)-melamine
20 parts by weight of a plasticizer on the basis of a silicone
35 parts by weight of a high-polymer synthetic thickening agent on the basis of acrylic acid-maleic acid-anhydride in the molar ratio of 1:1 and of a molar weight of 2,000,000
795 parts by weight of water
990 parts by weight,
and said paste is divided into 3 equal parts of 330 g each.
To part 1 are added 2 ml of water (printing paste A),
to part 2 are added 2 ml of a 33% aqueous solution of ammonium sulfate (printing paste B), and
to part 3 are added 2 ml of a 33% aqueous solution of ammonium sulfate and 2.5 g of the product of the invention which is defined in the following (printing paste C),
the additives being thoroughly stirred with the composition.

The viscosity-stabilizing effect of the product of the invention is seen through rheological comparison measurements of the viscosity of these 3 printing pastes by way of a rotary viscosimeter of the Searle type (Rheomat 30 of Messrs. Contraves, measuring system HS 25) at a shear rate D of 481 to 34 000 sec$^{-1}$, a temperature of 20° C. and a torque of 0°0 to 200 cmp (0 to 1.96 cNm). The measuring results in the form of flow curves may be seen from the rheogram:

The dash-dot curve was obtained with printing paste A, the continuous curve was obtained with printing paste B, and the dash-dash curve was obtained with printing paste C.

It may be seen from the rheogram that the viscosity of the printing paste A with the dash-dot flow curve is strongly reduced by the addition of an electrolyte (printing paste B with the continuous flow curve).

The printing paste C with the dash-dash flow curve shows the viscosity-improving effect of the product of the invention.

Preparation of the product of the invention: Pentaerythritol is oxalkylated with a mixture of ethylene oxide and propylene oxide in the molar ratio of 3:1 up to a molecular weight of 10 000. 1 Mole of this oxalkylate is then esterified with 2.9 moles of oleic acid at a temperature in the range of from 160° to 165° C. for 15 hours under a nitrogen atmosphere.

In the following Examples this product is termed "polyglycol ester" for short. These Examples describe the use of the polyglykol ester as emulsifying agent.

EXAMPLE 2

To 790 parts of an oil-in-water emulsion consisting of
75% of benzine (gasoline) having a boiling temperature of from 120° to 200° C.,
0.4% of polyglycol ester and
24.6% of water
are added successively, while stirring:
150 parts of a 40% aqueous dispersion of a copolymer consisting of
55% of n-butylacrylate,
23% of acrylonitrile,
17% of vinyl chloride, and
5% of N-methylol-methacrylamide,
30 parts of a 25% aqueous paste of C.I. Pigment Red 5, C.I. No. 12490, and
30 parts of a solution of diammonium phosphate of 30% strength in water.

As a result, a low foaming pigment printing paste is obtained which can easily be processed.

A cotton poplin fabric is printed with this printing paste, dried and fixed for 7 minutes at 150° C. Brilliant red prints are obtained which show a very good fastness to rubbing.

EXAMPLE 3

150 Parts of a benzine (petroleum fraction) having a boiling point of from 140° to 200° C. are introduced, while stirring at a high speed, into a mixture consisting of
600 parts of a 4% aqueous solution of sodium alginate,
10 parts of sodium m-nitrobenzene-sulfonate,
2 parts of polyglycol ester,
28 parts of C.I. Reactive Yellow C.I. 18972,
10 parts of sodium hydrogencarbonate, and
200 parts of water
to form an emulsion.

With this low foaming printing paste which is easy to process, a fabric of spun rayon is printed, then dried, fixed for 5 minutes in saturated steam, and washed. Already following a rather short rinsing and washing process the fabric does no longer contain any residual thickening agents. After drying, the high brilliancy of the yellow prints may be seen even more clearly.

EXAMPLE 4

A fabric of polyethylene-glycol terephthalate is printed with a printing paste consisting of
40 parts of a 20% aqueous paste of C.I. Disperse Orange, C.I. 26080 and
960 parts of a semi-emulsion having a content of 350 parts of benzine (gasoline) as defined in Example 3, 648 parts of a 6% aqueous solution of a locust bean flour ether, and 2 parts of polyglycol ester,
thereafter said fabric is dried, fixed for 1 minute in hot air of a temperature of 200° C. and then washed following a reductive treatment.

Brilliant orange-colored prints are obtained which show very sharp outlines.

EXAMPLE 5

20 Parts of dibenzyl ether are introduced, while stirring with a turbo-stirrer, into a mixture consisting of
20 parts of water and
0.1 part of polyglycol ester, at room temperature. Subsequently the mixture is continued to be stirred at that temperature for 5 to 10 minutes. The emulsion obtained is very stable and does not show any signs of separation for several months.

EXAMPLE 6

20 Parts of dibenzyl ether are introduced, while stirring with a turbo-stirrer, into a mixture consisting of
20 parts of water and
0.2 part of polyglycol ester, at room temperature. Subsequently the mixture is continued to be stirred at the same temperature for 5 to 10 minutes. The emulsion obtained is very stable and does not show any signs of separation for several months.

EXAMPLE 7

By stirring with a turbo-stirrer for 5 to 10 minutes at room temperature, an emulsion is prepared from 20 parts of toluene,
20 parts of water, and
0.1 part of polyglycol ester. The emulsion obtained is very stable and does not show any signs of separation for several weeks.

EXAMPLE 8

20 Parts of a commercial spindle oil are mixed with 20 parts of water and
0.6 part of polyglycol ester and the mixture is stirred for 5 to 10 minutes with a turbo-stirrer at room temperature. A very stable oil-in-water emulsion is obtained.

EXAMPLE 9

20 Parts of the caoutchouc age resisting agent Vulkanox KSM$^{(R)}$ (mixture of aralkylated phenols; commercial product of Messr. Bayer AG, Leverkusen, Federal Republic of Germany) are mixed with 0.5 part of polyglycol ester and 20 parts of water. The mixture is stirred with a turbo-stirrer for 5 to 10 minutes at room temperature. A very stable emulsion is obtained which does not show any signs of separation for several months.

EXAMPLE 10

200 Grams of methacrylic acid methyl ester,
400 g of demineralized water, and
10 g of polyglycol ester are introduced into a 2-liter three-neck flask provided with stirrer and reflux condenser. The contents of the flask are rinsed with nitrogen and then heated to 95° C. and are subsequently activated with a solution of 0.2 g of potassium peroxo disulfate in 10 g of demineralized water. Upon starting the reaction, the mixture is stirred for 30 minutes, whereupon the following solutions are uniformly added within one hour at an internal temperature of 95° C:

(1) A solution of 0.4 g of potassium peroxo disulfate in 100 g of water and
(2) a solution of 0.2 g of triethanolamine in 80 g of water.

After said solutions have been added completely, the mixture is continued to be stirred for 2 hours at 95° C.

A polymer emulsion is obtained which is practically free from coarse and fine coagulate. The conversion rate ot the monomers is 95%.

EXAMPLE 11

200 Grams of styrene,
400 g of demineralized water, 8 g of polyglycol ester, and
2 g of a straight-chain $C_{12}$ to $C_{18}$-alkyl-sulfonic acid-ethanol-amide mixture are introduced into a 2-liter three-neck flask provided with stirrer and reflux condenser. The contents of the flask are rinsed with nitrogen and thereafter heated to 95° C., whereupon they are activated with a solution of 0.2 g of potassium peroxo disulfate in 10 g of demineralized water. Upon starting the reaction, the mixture is stirred for 30 minutes, and subsequently the following solutions are uniformly added within one hour at an internal temperature of 95° C.:

(1) A solution of 0.4 g of potassium peroxo disulfate in 100 g of water and
(2) a solution of 0.2 g of triethanolamine in 80 g of water. After said solutions have been added completely, the mixture is continued to be stirred for 2 hours at 95° C.

A polymer emulsion is obtained which is free from coarse or fine coagulate, and the monomer conversion rate is 100%.

We claim:

1. Compounds of the formula

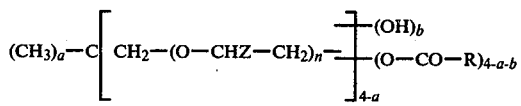

in which
R is an open-chain aliphatic radical having from 9 to 19 carbon atoms; Z stands for hydrogen or methyl, the ratio of H:CH$_3$ being from 2:1 to 4:1;
a is zero or 1,
b is 1 to 1.5, and
(4-a)·n is 150 to 300.

2. Compounds as claimed in claim 1, in which R—CO— represents the acyl radical of a fatty acid having from 11 to 17 carbon atoms in the radical R.

3. Compounds as claimed in claim 1 or 2, in which the ratio of H:CH$_3$ in the radical Z is from 2.5:1 to 3.5:1.

4. Compounds as claimed in claims 1, 2 or 3 in which (4-a)·n is from 200 to 250.

5. Compounds as claimed in claim 1, in which RCO is oleyl; the ratio of H:CH$_3$ in the radical Z is 3:1 in random distribution, a is zero, (4-a)·n is about 210, and b is 1.1.

6. A process for modifying the surface or interface tension of liquids, which comprises adding to said liquid an effective amount to accomplish said modification of a compound as defined in claim 1.

7. A process as claimed in claim 6, wherein the liquid consists of or contains water.

8. A process for modifying or stabilizing the viscosity of an aqueous system, which comprises incorporating into said system an effective amount to accomplish said modification or stabilization of a compound as defined in claim 1.

9. A process for emulsifying a water-immiscible liquid in water, which comprises agitating said liquid in water together with an effective emulsifying amount of a compound as defined in claim 1.

10. An aqueous emulsion of a water-immiscible liquid containing an effective emulsifying amount of a compound as defined in claim 1 as an emulsifying agent.

11. An aqueous emulsion as claimed in claim 10 consisting essentially of 0.1 to 2% by weight of a compound as defined in claim 1, 50 to 70% by weight of a water-immiscible solvent and 28 to 49.9% by weight of water.

12. A composition as claimed in claim 11 containing 0.2 to 1% by weight of the compound as defined in claim 1.

13. A printing paste or padding liquor containing per kilogram of paste or per liter of liquor 0.1 to 100 g of a compound as defined in claim 1.

14. A composition as claimed in claim 13 containing 2 to 30 g of said compound.

* * * * *